United States Patent
Whitehead et al.

(10) Patent No.: US 7,112,044 B2
(45) Date of Patent: Sep. 26, 2006

(54) BLADES

(75) Inventors: Christopher M Whitehead, Derby (GB); Simon Read, Derby (GB)

(73) Assignee: Rolls-Royce plc, London (GB)

( * ) Notice: Subject to any disclaimer, the term of this patent is extended or adjusted under 35 U.S.C. 154(b) by 77 days.

(21) Appl. No.: 10/872,557

(22) Filed: Jun. 22, 2004

(65) Prior Publication Data

US 2005/0008492 A1 Jan. 13, 2005

(30) Foreign Application Priority Data

Jul. 11, 2003 (GB) ................................ 0316228.6

(51) Int. Cl.
*B64C 11/16* (2006.01)
(52) U.S. Cl. .................... 416/229 R; 415/9; 416/232; 416/241 R
(58) Field of Classification Search ............ 415/9; 416/225, 229 R, 232, 233, 241 R, 241 A
See application file for complete search history.

(56) References Cited

U.S. PATENT DOCUMENTS 3,396,923 A * 8/1968 Windecker ............... 244/123.5
5,042,968 A * 8/1991 Fecto ........................ 416/226
2002/0090302 A1 7/2002 Norris

FOREIGN PATENT DOCUMENTS

| GB | 0 561 716 SP | 6/1944 |
|---|---|---|
| GB | 1 323 883 SP | 7/1973 |
| GB | 2 041 829 A | 9/1980 |
| JP | 9 089 709 AB | 4/1997 |

* cited by examiner

Primary Examiner—Edward K. Look
Assistant Examiner—Dwayne J White
(74) Attorney, Agent, or Firm—W. Warren Taltavull; Manelli Denison & Selter PLLC

(57) ABSTRACT

Percussive impacts due to bird strikes upon the hollow fan blades 20 are a well known problem. These percussive impacts not only deform previous fan blades but also reduce their stiffness. In accordance with the present invention, hollow fan blades 20 incorporate a cavity 23 within which, a matrix 24 with embedded expandable elements 25, is located. Thus, upon a percussive impact these expandable elements 25 are released in order to create an internal pressure within the cavity 25 which acts outwardly in order to relieve deformation and also stiffen the blade 20 as a result of the over pressure within the cavity 23.

34 Claims, 2 Drawing Sheets

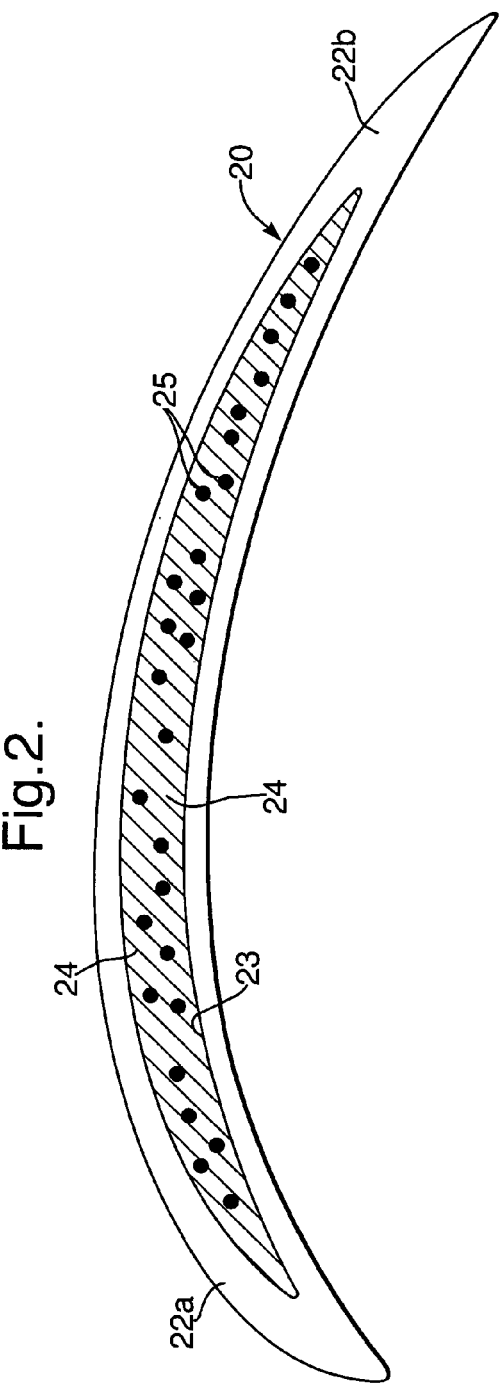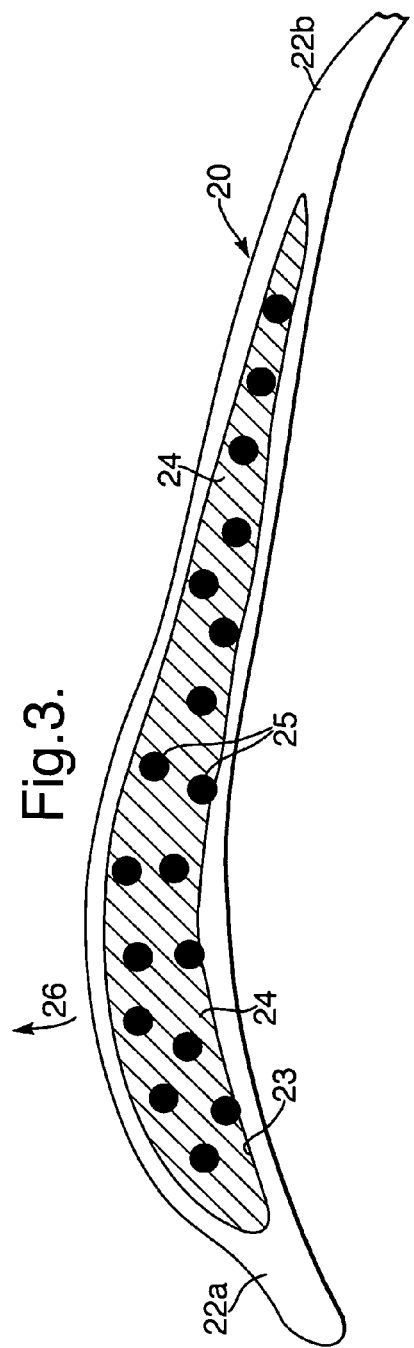

BLADES

FIELD OF THE INVENTION

The present invention relates to blades and more particularly to hollow fan blades used in gas turbine engines.

BACKGROUND OF THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts.

It will be understood that particularly with regard to aircraft engine installations, weight is an important consideration. In such circumstances, if turbine fan blades can be hollow there is a significant reduction in both individual and collective weight of the fan blades and the propulsive fan 12. However, it will also be understood that in view of the significant air flow rates there is a high danger with regard to impacts, particularly upon the fan blades of the propulsive fan 12 at the air intake 11 end of the engine 10. It will be understood that these impacts may be as a result of debris or bird strikes on the propulsive fan 12 and possibly as a result of secondary and cursory impacts through the engine. In such circumstances, the inherent reduced weakness and susceptibility to deformation of hollow fan blades is a significant problem.

It will be understood that the fan blade assembly in the engine must be balanced for appropriate operation and that each individual fan blade must remain sufficiently structurally strong for continued operation until repair is possible. Previously, it has been known to fill the hollow cavity within fan blades with elastomeric materials in order to provide principally vibration damping within the blade but also by implication some reinforcement of that blade. Nevertheless, it will be appreciated that these hollow cavity fillings being of an elastomeric nature will still become distorted with the fan blade when exposed to severe impact loads beyond the elastic deformation response of that fan blade in association with the filling.

As indicated above, the most dangerous impacts to fan blades relate to so-called bird strikes. Such bird strikes alter the run on behaviour of hollow fan blades due to alterations in the propulsive fan configuration which detrimentally affect both structural stiffness and natural frequency within the fan blade. These variations in structural stiffness and frequency combine with leading edge deformations in order to cause blade flutter and possibly further structural degradation due to vibrational work hardening etc. In view of these factors, it is generally accepted good practice to provide a more robust hollow fan blade than strictly necessary in order to resist initial deformation. Clearly, more robust fan blades necessitate greater blade mass for the same material type.

SUMMARY OF THE INVENTION

In accordance with the present invention, there is provided a blade for a gas turbine engine, the blade having a hollow cavity and that hollow cavity incorporating releasable bias means to present outward pressure when subjected to significant percussive load.

Preferably, the releasable bias means comprises a matrix with incorporated rupturable elements which rupture in use upon percussive load to provide the outward pressure.

Typically, the matrix is an elastomeric material or foam or viscous liquid or resin. Normally, the matrix also acts as a damping medium for the blade.

Typically, the rupturable elements comprise capsules or other elements embedded within the matrix. Generally, these rupturable elements are uni-operational or reactive. Typically, uni-operational rupturable elements upon rupture provide their own outward pressure in co-operation with other rupturable elements. Generally, reactive rupturable elements release upon rupture reactants in order to react with other reactants from other reactive rupturable elements in order to provide the outward pressure. Alternatively, reactive rupturable elements react with the matrix in order to provide the outward pressure. Typically, the rupture elements incorporate a liquid or gas or generate a foam in order to provide the outward pressure. Possibly, the rupturable elements incorporate points or lines of weakness to facilitate rupture upon application of a percussive load. Advantageously, the rupturable elements provide a directional response upon rupture with regard to the outward pressure. Possibly, the rupturable elements rupture by discharge through perforations in the surface of the rupturable element. Generally, the rupturable elements are differentially distributed and/or sized and/or variously responsive at different locations within the hollow cavity.

Possibly, the blade incorporates means for blade venting to limit the extent of outward pressure presented within the hollow cavity. Possibly, blade venting is at a tip of the blade. Alternatively, blade venting is through perforation pimple release of a part of the blade surface. Possibly, blade venting provides an indication of percussive loads to the blade through indicator means. Possibly, such indicator means comprises viewing blade venting at a sight hole in which presence of releasable bias means indicates percussive loading of a fan blade. Possibly, the releasable bias means changes colour when subjected to percussive load to provide indication means upon application of that percussive load in use.

Also in accordance with the present invention there is provided a gas turbine engine incorporating a fan blade as described above.

BRIEF DESCRIPTION OF THE DRAWINGS

An embodiment of the present invention will now be described by way of example only with reference to the accompanying drawings in which:

FIG. 2 is a schematic cross-section of a fan blade prior to a percussive impact; and, FIG. 3 is a schematic cross-section of a fan blade after a percussive impact.

DETAILED DESCRIPTION OF THE INVENTION

Figure 1:
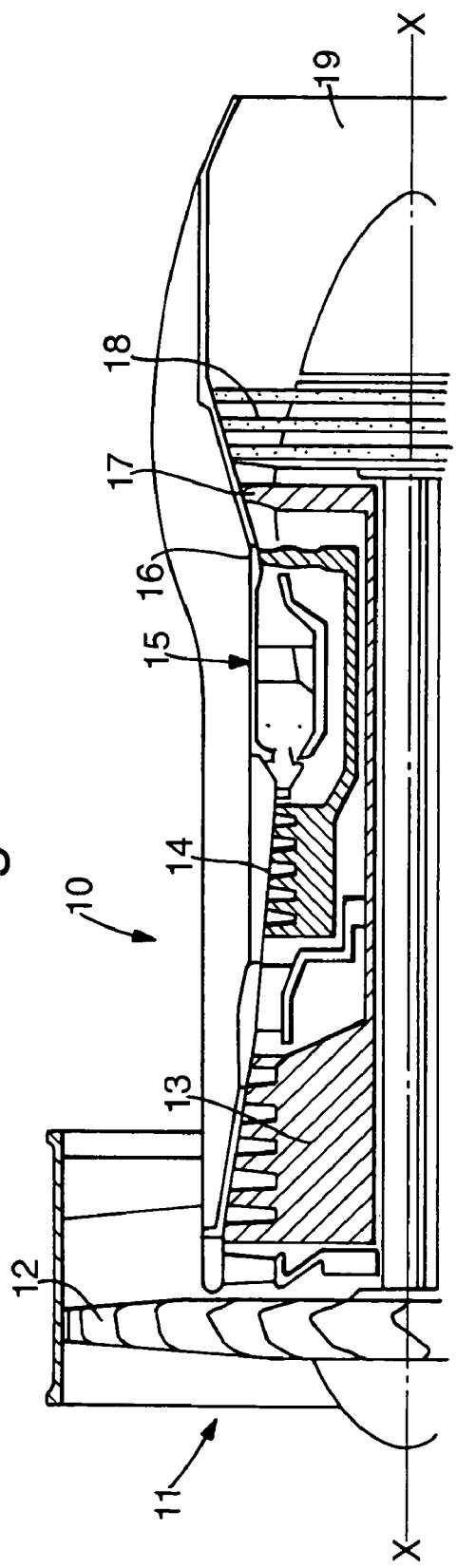
FIG. 1 is a schematic section of a gas turbine engine.

Referring to FIG. 2 illustrating a schematic cross-section of a fan blade 20 in accordance with the present invention. This fan blade 20 comprises a hollow aerofoil 22 in which a cavity 23 is filled with a matrix 24. Typically, the aerofoil 22 is made from titanium alloy panels, for example T1 6A1 4V alloy appropriately secured together. The matrix 24 is generally elastomeric and acts as a damping medium for the fan blade 20. Within the matrix 24 a number of capsules or elements 25 are appropriately located and distributed.

The fan blade 20 as configured in FIG. 2 is shown prior to a percussive impact. Thus, the fan blade 20 is consistent with the fan blade as installed within a gas turbine engine.

Referring to FIG. 3 illustrating a schematic cross-section of the fan blade 20 subsequent to a percussive impact such as a bird strike. Thus, the blade 20 comprises an aerofoil 22 within which the cavity 23 is filled by the matrix 24 but in the after percussive impact configuration depicted in FIG. 3 the capsules or elements 25 have expanded as a result of rupture or other activations due to that impact. In such circumstances, the elements 25 have releasably expanded due to the percussive impact in order to create an outward pressure in the direction of arrowheads 26. This outward expansion within the matrix 24 ensures the removal of any voids or gaps in the cavity 23 as a result of the percussive impact. Furthermore, the fan blade 20 stiffness following percussive impact has been increased. In effect, the elements 25 expanding within the constriction of the cavity 23 and the matrix 24 exerts an increased internal pressure within the cavity 23 which causes greater blade 20 stiffness. The increased internal pressure within the cavity 23 also acts to prevent or reverse any buckling or collapse of cavity 23.

In view of the reactive nature of the releasable expandable capsules or elements 25, it will be appreciated that the aerofoil 22 may be made from lighter or a thinner cross-section of material than previously acceptable in order to provide appropriate resistance to bird strike level percussive impacts. Clearly, it is necessary to set and predetermine the appropriate level of percussive impact load to release the expansive bias within the cavity 23 in the form of increased internal pressure within that cavity 23. As indicated above, generally, this level of impact load will be determined by expected bird strike scenarios.

As with previous hollow fan blades, it is necessary to provide vibration damping within the cavity of such blades. Furthermore, it will be appreciated that thinner cross-section or lighter materials used with fan blades in accordance with the present invention will render these fan blades more susceptible to vibration such that it is more important to provide appropriate damping. In such circumstances, the matrix 24 which fills the cavity 23 and within which the capsules or elements 25 are embedded will act as an appropriate vibration damping filler both during normal operation (FIG. 2) and post percussive impact operation (FIG. 3).

As can be seen in FIG. 3, generally the fan blade 20 will bulge about the point of percussive impact. However, the fan blade 20 will remain stiff and operational. Thus, the present fan blade 20 subsequent to a percussive impact will be able to continue to operate until appropriate replacement. Generally, the overall blade fan 20 thickness may be reduced which in turn leads to a lighter aerofoil, root attachment mechanism for the fan blade 20 and necessary containment system for the fan blade within the engine cowling/casing.

A trailing edge 22b of the fan blade 20 will generally have an improved integrity due to greater resistance to deformation. The filler in the form of matrix 24 and elements 25 in the trailing fan blade will also exert a reactive outward force.

It will be appreciated that as indicated above, the expandable capsules or elements 25 will react to percussive impacts. This reaction will generally be in terms of a rupture to the capsule or element 25 in order to release an expandable mechanism. Generally, the impact necessary for this rupture and expansion will be predetermined for each capsule or element 25.

The fan blade 20 will incorporate appropriate release or vent mechanisms to prevent such excessive outward pressure within the cavity in the direction of arrowheads 26. For example, the internal pressure created within the cavity 23 will vent as a fan blade 20 tip is broken. The fan blade 20 may be configured with a line of weakness to create such venting at the most appropriate location. It is most important that the fan blade 20 has a significant run on capacity after percussive impact in order to allow the gas turbine engine 10 incorporating the now damaged fan blade 20 to operate safely until the damaged fan blade 20 can be replaced or repaired.

As indicated above, the matrix 24 and expandable elements or capsules 25 in combination provide a releasable bias within the cavity 23. The bias to create outward pressure in the direction of arrowheads 26 occurs when a percussive load is applied to the fan blade which ruptures the elements 25 in order to create expansion. As indicated previously, the matrix 24 is generally of an elastomeric nature in order to provide vibrational damping. In such circumstances, the matrix 24 will absorb some of the percussive impact but when that percussive impact is excessive, rupture and release of the elements 25 occurs. As an alternative to providing an elastomeric matrix, it will be understood that the matrix could be a foam or viscous liquid or resin with varying levels of deformation response.

The elements or capsules 25, as indicated upon application of a percussive force, generate expansion. There are a number of mechanisms by which these elements 25 can create such expansion. The elements 25 could be unioperational in that simple rupture of an element 25 releases a pressurised gas or other mechanism in order to create an expansion in volume over than of the original element 25 value. Alternatively, the elements 25 could incorporate reactants which upon specific release react together in order to create volumetric expansion and therefore increased pressure within the cavity 23 for a presented outward pressure in the direction of arrowheads 26.

These reactants may be held within respective compartments of the elements 25 which mix on rupture or reactants from different elements 25 when released from their respective elements 25 acting to provide volumetric expansion or a reactant could be released from the elements 25 which react with the base matrix 24 in order to create expansion. Typically, the reactants within the elements 25 will be in liquid form but once released by rupture will create a gas or form a foam in order to create the outward pressure within the cavity 23. Uni-operational elements 25 may simply constrain relatively high pressure gas which is released upon rupture. Examples of suitable gases for pressurised storage in uni-operational elements include inert gases such as argon, helium or nitrogen.

Reactants which may be stored within the elements 25 in order to create gas or foam for the outward pressure upon rupture are. Typically, these reactants take the form of an adhesive based upon an epoxy, polyurethane, silicon or similar mechanism matrix within which an appropriate foaming agent is provided. These foaming agents are also used with regard to detergents, forming closed cell foam products, fire extinguishers, concrete adhesives and soil stabilisers. Appropriate foaming agents will be chosen in accordance with particular requirements. With the present invention, fatigue failures in a fan blade can be controlled in order to prolong the lifespan of a fan blade component. The filler, including the reactant, releases a foaming adhesive which expands and so is able to fill large voids and cavities when activated under an impact load.

Reliable release of the outward pressure is a requirement when subjected to a predetermined percussive load. In order to achieve this reliability generally each element or capsule 25 will incorporate at least one line or position of weakness to ensure release when subjected to a predetermined impact load. In such circumstances, by appropriate determination of distribution and/or size and/or operational type of elements 25 it is possible to provide appropriate and proportional response within the fan blade 20 to impact loads. It will be understood that impacts at different parts of the fan blade 20 may require different responses and this as indicated can be reflected by element 25 distribution, size and type for best performance. In such circumstances, the distribution and/or size and/or operational type of elements 25 may be different in different parts or zones of the blade 20.

In order to maximise performance by appropriate use of lines of weakness within the elements 25 it is possible to achieve directional response from the elements or capsules 25. For example, by providing crossed lines of weakness, it will be appreciated that petal or bud rupture of the element 25 may be achieved which is of a directional nature. Alternatively, each element 25 may incorporate a perforated surface such that upon compression due to percussive load, reactants within the element 25 are forced through the perforations to create expansion either by gas release or reaction. These perforations may be asymmetrical about the elements 25 for directional control. It will be understood that if a directional response is required then each individual element 25 will require appropriate orientation within the cavity 23 and this will create manufacturing problems but may be achieved through magnetic alignment techniques and float bubble component manipulation processes.

A further alternative with regard to achieving release of the expansion within the elements 25 could be through providing a capsule within which a first reactant liquid is located along with a reactant pill floating within that liquid such that upon percussive impact the pill is broken to release a mixture of the reactants and expansion of the element. In such circumstances, the element itself may not rupture but simply expand due to the reaction between the reactants within the element. Such an approach may allow use of more aggressive reactants without danger of corrosive or detrimental action within the fan blade 20 or matrix 23.

As indicated above, excessive outward pressure within the cavity 23 may cause ballooning of the fan blade 20. In such circumstances, typically each fan blade will incorporate an appropriate venting or release mechanism for over expansion. This release mechanism will take the form of a hole or expansion cavity at an appropriate position within the blade 20. Typically, such vent holes or expansion cavities will be located at the tip ends of the fan blades 20. It will be understood that if such vent holes or expansion cavities can be visually inspected then these vent holes or expansion cavities act as sight holes to indicate occurrence of an impact above the predetermined percussive load and so indicate that the fan blade requires replacing. By incorporating appropriate dyes such sight inspection of vent holes or expansion cavities may be made easier. It will also be understood that pop-out sections or pimples could be provided which extend from the cavity 23 to the surface such that upon release of the elements 25 to cause expansion and therefore overpressure within the cavity 23 these pop-out elements are raised above the blade 20 surface. Similarly, it will be appreciated that vent holes may be plugged during normal operation but this plug displaced when elements 25 are released in order to create pressure within the cavity 23. It is important that the overpressure created within the cavity 23 is not itself detrimental to fan blade 20 operation. For example, it will be appreciated if the over pressure within the cavity 23 were excessive then that overpressure itself could rupture the aerofoil 22 or at least create cracking significantly reducing the structural strength of the fan blade 20. It is judicial use of overpressure within the cavity 23 in order to provide improved fan blade 20 stiffness after percussive impact which is of prime concern. It will be appreciated that insufficient over pressure will not provide the necessary improvement in stiffness necessitated by the diminution as a result of percussive impact whilst over pressure itself may create undue balloon distortion and rupture the cavity 23 itself. In order to avoid both of these scenarios, it is important that the distribution and/or size and/or type of elements 25 chosen for a particular fan blade 20 are determined for a proportional response.

Normally, the matrix 24 and elements 25 will simply be loaded in a liquid state into the cavity 23 and allowed to set in order to substantially fix element 25 location. As indicated above, techniques such as magnetic attraction with respect to elements 25 may be used in order to achieve some orientation and manipulation techniques with regard to the fan blade 20 may also be used to provide some control of element 25 distribution but nevertheless, with such a simple packing approach it may be difficult to specifically locate elements 25 as required. In such circumstances, bands or zones within the cavity 23 may be built up in staged steps from different combinations of matrix 24 and elements 25 in terms of proportion and types to achieve the desired response in use. It may be possible in some circumstances, to mould an insert for the cavity 23 externally of the fan blade 20. In such circumstances, the insert may allow greater positioning of the elements 25. It will be understood that once moulded and set the insert would simply be slipped into the cavity 23. Generally, more elements 25 will be located towards the leading edge 22a of the fan blade 20 rather than the trailing edge 22b as it is the leading edge which is more likely to be exposed to percussive impacts.

Although the invention has been described with reference to a fan blade, it is equally applicable to other hollow blades.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A blade for a gas turbine engine, the blade having a hollow cavity, the hollow cavity incorporating releasable bias means to present outward pressure when subjected to significant percussive load, wherein the releasable bias means comprising a matrix incorporating rupturable elements which rupture in use upon percussive load to provide the outward pressure wherein said rupturable elements are reactive and wherein said reactive rupturable elements release upon rupture reactants in order to react with other reactants from other reactive rupturable elements in order to provide the outward pressure.

2. A blade as claimed in claim 1 wherein the rupturable elements incorporate or generate a foam in order to provide the outward pressure.

3. A blade as claimed in claim 1, wherein the rupturable elements release an adhesive and a foaming agent.

4. A blade as claimed in claim 3 wherein the adhesive is selected from the group comprising an epoxy, polyurethane and silicon.

5. A blade for a gas turbine engine, the blade having a hollow cavity, the hollow cavity incorporating releasable bias means to present outward pressure when subjected to significant percussive load, wherein the releasable bias means comprises a matrix incorporating rupturable elements which rupture in use upon percussive load to provide outward pressure, these rupturable elements are reactive, wherein the reactive rupturable elements release upon rupture two reactants in order to react in order to provide outward pressure.

6. A blade as claimed in claim 5 wherein the reactants are held within separate compartments of the rupturable elements.

7. A blade as claimed in claim 5 wherein a first reactant is held within the rupturable elements and a second reactant is held in breakable pills within the first reactant.

8. A blade as claimed in claim 5 wherein the rupturable elements incorporate or generate a foam in order to provide the outward pressure.

9. A blade as claimed in claim 5, wherein the rupturable elements release an adhesive and a foaming agent.

10. A blade as claimed in claim 9 wherein the adhesive is selected from the group comprising an epoxy, polyurethane and silicon.

11. A blade for a gas turbine engine, the blade having a hollow cavity, the hollow cavity incorporating releasable bias means to present outward pressure when subjected to significant percussive load, wherein the releasable bias means comprises a matrix incorporating rupturable elements which rupture in use upon percussive load to provide outward pressure, the reactive rupturable elements contain reactants, wherein the reactive rupturable elements release upon rupture reactants in order to generate a foam in order to provide the outward pressure.

12. A blade as claimed in claim 11, wherein the rupturable elements release an adhesive and a foaming agent.

13. A blade as claimed in claim 12 wherein the adhesive is selected from the group comprising an epoxy, polyurethane and silicon.

14. A blade for a gas turbine engine, the blade having a hollow cavity, the hollow cavity incorporating releasable bias means to present outward pressure when subjected to significant percussive load, wherein the releasable bias means comprises a matrix incorporating rupturable elements which rupture in use upon percussive load to provide outward pressure, the reactive rupturable elements contain reactants, wherein the reactive rupturable elements release upon rupture reactants in order to react in order to provide the outward pressure.

15. A blade as claimed in claim 14 wherein the matrix is selected from the group comprising elastomeric material, a foam, a viscous liquid and a resin.

16. A blade as claimed in claim 14 wherein the matrix is a vibration damping medium for the blade.

17. A blade as claimed in claim 14 wherein the rupturable elements incorporate points of weakness to facilitate rupture upon application of a percussive load.

18. A blade as claimed in claim 14 wherein the rupturable elements provide a directional response upon rupture with regard to the outward pressure.

19. A blade as claimed in claim 14 wherein the rupturable elements incorporate perforations to rupture by discharge through the perforations in the surface of the rupturable element.

20. A blade as claimed in claim 14 wherein the rupturable elements are differentially distributed and/or sized and/or variously responsive at different locations within the hollow cavity.

21. A blade as claimed in claim 14 wherein the blade incorporates means for blade venting to limit the extent of outward pressure presented within the hollow cavity.

22. A blade as claimed in claim 21 wherein the means for blade venting is at a tip of the blade.

23. A blade as claimed in claim 21 wherein the means for blade venting comprises perforation pimple release of a part of the blade surface.

24. A blade as claimed in claim 21 wherein the means for blade venting provides an indicator means for indication of percussive loads to the blade.

25. A blade as claimed in claim 24 wherein the indicator means comprises a sight hole for viewing blade venting in which presence of releasable bias means indicates percussive loading of a blade.

26. A blade as claimed in claim 24 wherein the indicator means comprises pop out sections which extend from the cavity to the surface of the blade and the pop out sections are displaceable so that they are raised above the surface of the blade upon rupture of the rupturable elements.

27. A blade as claimed in claim 14 wherein the rupturable elements incorporate or generate a foam in order to provide the outward pressure.

28. A blade as claimed in claim 14, wherein the rupturable elements release an adhesive and a foaming agent.

29. A blade as claimed in claim 28 wherein the adhesive is selected from the group comprising an epoxy, polyurethane and silicon.

30. A blade as claimed in claim 14 wherein the releasable bias means changes colour when subjected to percussive load to provide indication means upon application of that percussive load in use.

31. A blade as claimed in claim 14 wherein the blade is a fan blade.

32. A gas turbine engine incorporating a fan blade as claimed in claim 14.

33. A blade for a gas turbine engine, the blade having a hollow cavity, the hollow cavity incorporating releasable bias means to present outward pressure when subjected to significant percussive load, wherein the releasable bias means comprises a matrix incorporating rupturable elements which rupture in use upon percussive load to provide outward pressure, these rupturable elements are reactive, wherein the reactive rupturable elements release upon rupture reactants in order to react with said matrix in order to provide the outward pressure.

34. A blade as claimed in claim 33 wherein the rupturable elements incorporate or generate a foam in order to provide the outward pressure.

* * * * *